United States Patent
Herrera

(10) Patent No.: US 9,186,684 B2
(45) Date of Patent: Nov. 17, 2015

(54) COMMINUTING MACHINE DRIVE SYSTEM

(71) Applicant: Harris Waste Management Group, Inc., Tyrone, GA (US)

(72) Inventor: Javier Herrera, San Antonio, TX (US)

(73) Assignee: Harris Waste Management Group, Inc., Tyrone, GA (US)

( * ) Notice: Subject to any disclaimer, the term of this patent is extended or adjusted under 35 U.S.C. 154(b) by 182 days.

(21) Appl. No.: 13/863,815

(22) Filed: Apr. 16, 2013

(65) Prior Publication Data
US 2014/0021890 A1 Jan. 23, 2014

Related U.S. Application Data

(60) Provisional application No. 61/624,614, filed on Apr. 16, 2012.

(51) Int. Cl.
| | |
|---|---|
| *H02P 3/00* | (2006.01) |
| *B02C 25/00* | (2006.01) |
| *H02P 3/02* | (2006.01) |
| *H02P 3/12* | (2006.01) |
| *B02C 18/22* | (2006.01) |
| *B02C 18/24* | (2006.01) |

(52) U.S. Cl.
CPC .............. *B02C 25/00* (2013.01); *B02C 18/2225* (2013.01); *B02C 18/24* (2013.01); *H02P 3/02* (2013.01); *H02P 3/12* (2013.01)

(58) Field of Classification Search
CPC ............... H02P 3/22; H02P 3/20; H02P 7/34; H02P 23/0072; H02P 3/12; G05B 19/10; G05B 2219/43078; H01C 10/04
USPC ......... 318/375, 376, 255, 256, 258, 264, 293, 318/295, 371, 373, 431; 241/186.2, 285.1, 241/291
See application file for complete search history.

(56) References Cited

U.S. PATENT DOCUMENTS

| | | | | | |
|---|---|---|---|---|---|
| 1,738,452 | A | * | 12/1929 | Scott ............................. | 318/740 |
| 2,779,906 | A | * | 1/1957 | Adriansen ..................... | 318/759 |
| 3,153,182 | A | * | 10/1964 | Choudhury ................... | 318/759 |
| 3,465,973 | A | | 9/1969 | Williams | |
| 3,486,097 | A | * | 12/1969 | Shekro .......................... | 318/744 |
| 3,566,165 | A | * | 2/1971 | Lohr ........................... | 310/67 R |

(Continued)

OTHER PUBLICATIONS

"Our Full Service Solution for a Complete Shredder Drive System." MKS Analasser-und Elektrotechnik GmbH. Julich, Germany.

(Continued)

*Primary Examiner* — Bentsu Ro
*Assistant Examiner* — Thai Dinh
(74) *Attorney, Agent, or Firm* — Perman & Green, LLP

(57) ABSTRACT

A comminuting machine includes a frame, a comminuting rotor coupled to the frame, and a rotary drive coupled to the rotor. The rotary drive including a controller, a multi-phase motor connected to the controller, a set of contactors disposed between the controller and the multi-phase motor for selectively providing driving motive force to the multi-phase motor, and at least one rheostat disposed between the controller and the multi-phase motor, in parallel with the first set of contactors, for selectively providing a stopping resistance to the multi-phase motor to effect frictionless braking of the comminuting rotor, wherein the controller is configured to operate the set of contactors and the at least one rheostat to single phase lines of the multi-phase motor for providing the stopping resistance.

18 Claims, 11 Drawing Sheets

(56) References Cited

U.S. PATENT DOCUMENTS

| | | | |
|---|---|---|---|
| 3,610,543 A | 10/1971 | Jensen | |
| 3,716,770 A * | 2/1973 | Habisohn | 318/259 |
| 3,915,395 A | 10/1975 | Graf | |
| 3,991,352 A * | 11/1976 | Fry et al. | 318/759 |
| 4,226,375 A | 10/1980 | Cameron | |
| 4,406,982 A * | 9/1983 | McClellan, Jr. | 388/839 |
| 4,449,673 A | 5/1984 | Cameron | |
| 4,830,291 A | 5/1989 | Williams | |
| 4,937,509 A * | 6/1990 | Gundlach | 318/362 |
| 5,062,575 A | 11/1991 | Barnabie et al. | |
| 5,310,016 A * | 5/1994 | Rudelle | 180/65.1 |
| 7,063,282 B2 | 6/2006 | Jonkka et al. | |
| 7,168,640 B2 | 1/2007 | Lipowski | |
| 7,222,805 B1 | 5/2007 | Williams, Jr. | |
| 7,556,212 B1 | 7/2009 | Huang | |
| 7,900,858 B2 | 3/2011 | Ragnarsson | |
| 2006/0086850 A1 | 4/2006 | Cohen et al. | |
| 2007/0069053 A1 | 3/2007 | Ortoncelli | |
| 2007/0241218 A1 | 10/2007 | Peterson et al. | |
| 2010/0006683 A1 | 1/2010 | Fukuhiro | |
| 2011/0036936 A1 * | 2/2011 | Herrera | 241/186.2 |

OTHER PUBLICATIONS

Green. "Ball Mill Drive Motor Choices." Presentation at the IEEE/PCA Cement Industry Technical Conference. 2000. Salt Lake City, UT, USA.

Wound Rotor Motor Technology."Teco-Westinghouse Motor-Company."Round Rock, TX, USA.

"Induction & Synchronous Motors." 2008, General Electric Company, Fort Wayne, IN, USA.

"Rheostatic Control." Myanmar Ministry of Science and Technology. 39-39. Available at http://most.gov.mm/techuni/media/EP_03061_5.pdf.

* cited by examiner

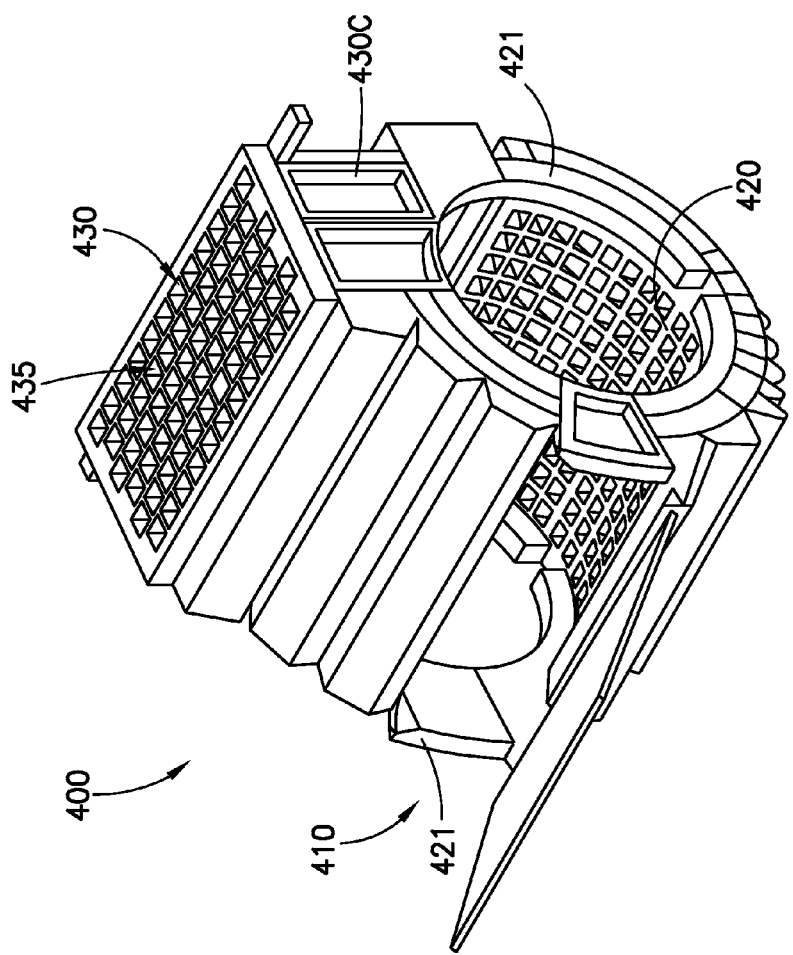

COMMINUTING MACHINE DRIVE SYSTEM

BACKGROUND

1. Field

The exemplary embodiments generally relate to comminuting machines and, more particularly, to drive systems for comminuting machines.

2. Brief Description of Related Developments

Generally comminuting machines, such as those used in the material handling industry, include a feed device for feeding comminuting feed material into, for example, a mill or shredded for breaking the comminuting feed material into smaller pieces. The shredder may have a disc rotor assembly that needs to be started and stopped periodically during operation of the comminuting machine. There is a desire to have starting and stopping of the disc rotor in a controlled fashion.

BRIEF DESCRIPTION OF THE DRAWINGS

The foregoing aspects and other features of the disclosed embodiment are explained in the following description, taken in connection with the accompanying drawings, wherein:

FIGS. 4A and 4B are schematic illustrations of a portion of the comminuting machine of FIGS. 1A-1C in accordance with aspects of the disclosed embodiment;

DETAILED DESCRIPTION OF THE EXEMPLARY EMBODIMENT(S)

Figure 1A:
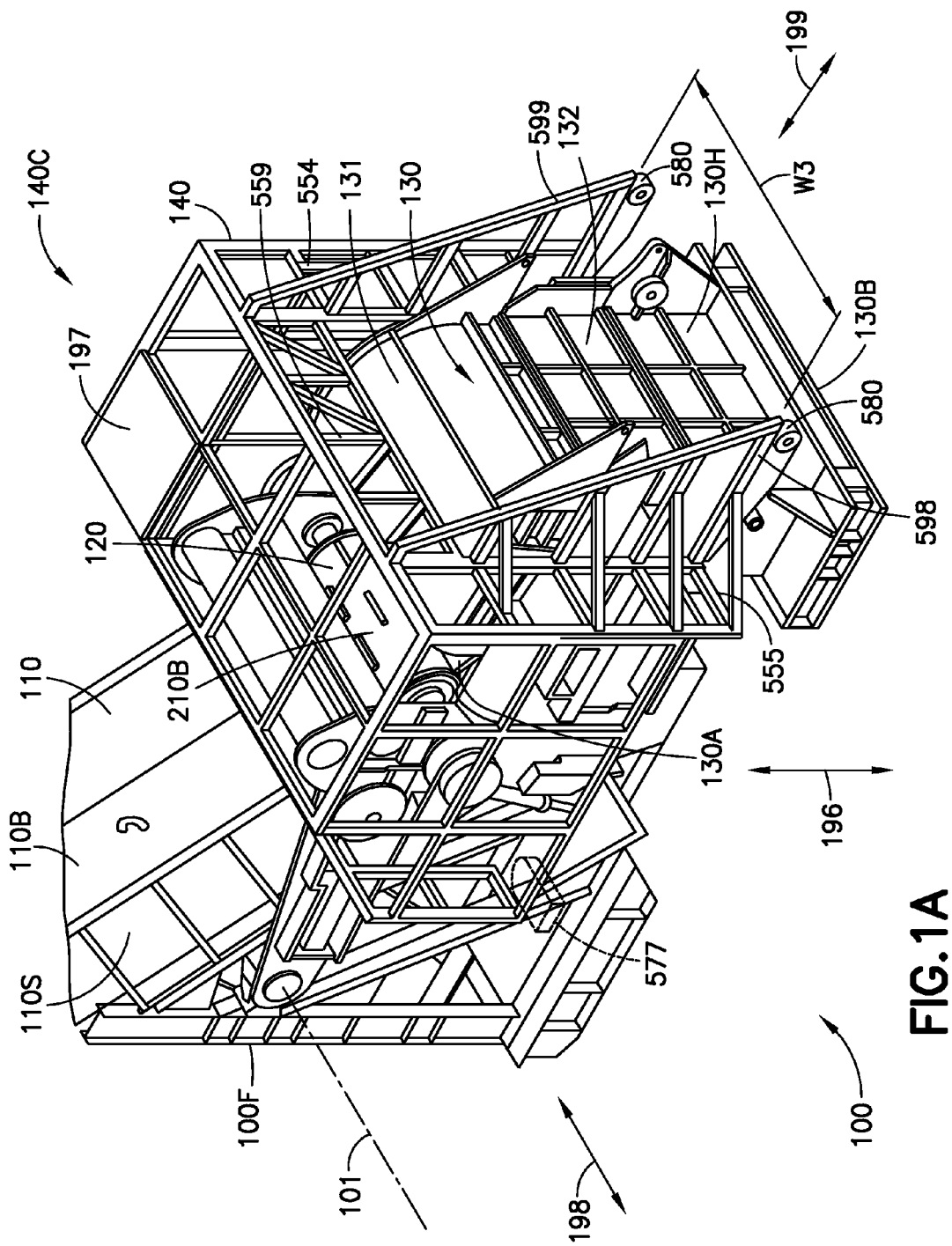
FIGS. 1A-1C are schematic illustrations of a portion of comminuting machine in accordance with in accordance with aspects of the disclosed embodiment.
Figure 1B:
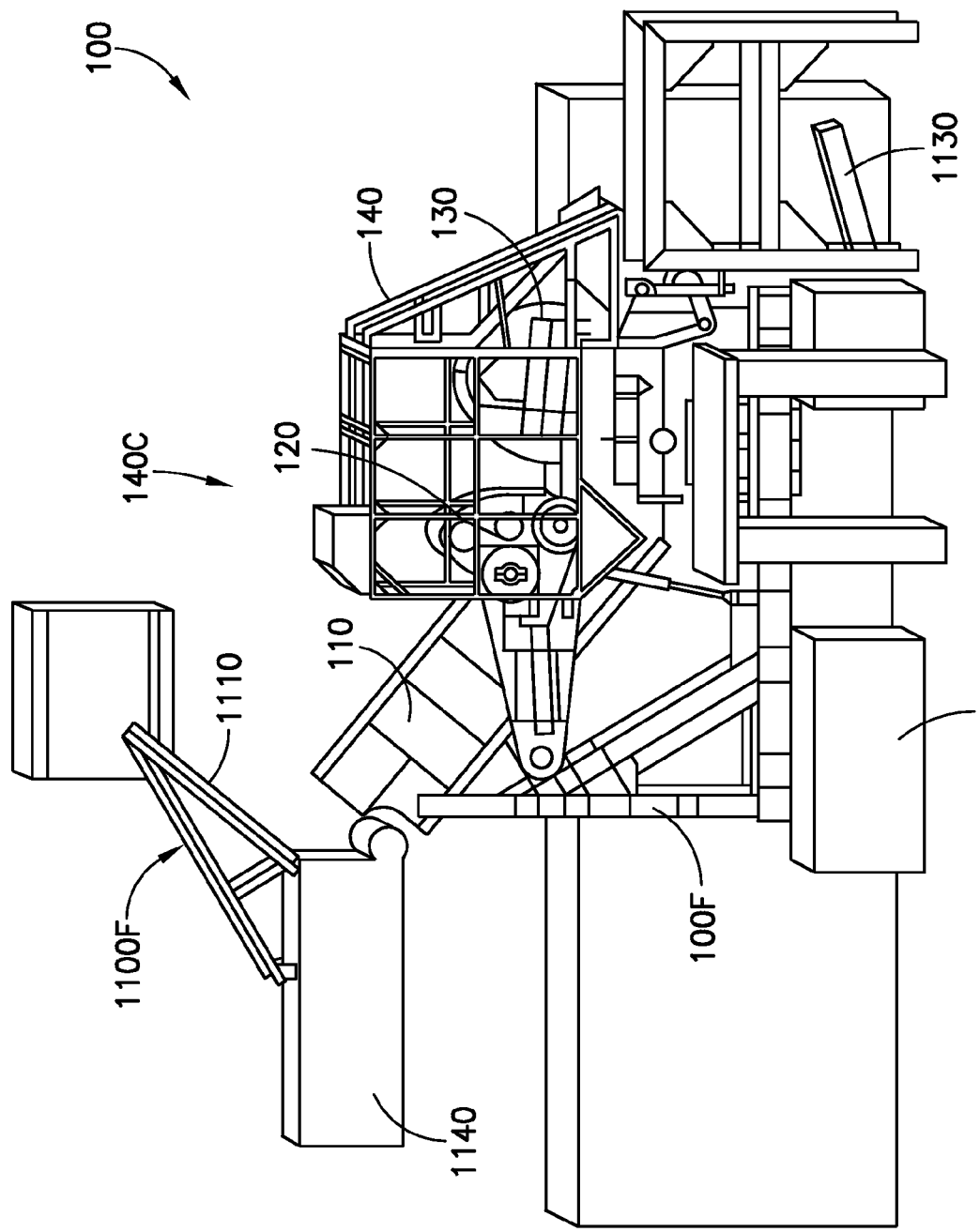

FIGS. 1A and 1B illustrate portions of a comminuting machine 100 in accordance with the exemplary embodiment. Although the disclosed embodiment will be described with reference to the drawings, it should be understood that the disclosed embodiment can be embodied in many alternate forms. In addition, any suitable size, shape or type of elements or materials could be used.

In the exemplary embodiment, the comminuting machine 100 is configured as a hammer mill shredder for exemplary purposes only. It should be understood that the exemplary embodiments described herein may be applied to any suitable comminuting machine without departing from the scope of the exemplary embodiments. In this example, the comminuting machine 100 may be configured for "shredding" or otherwise breaking up any suitable comminuting feed materials such as for material management, reclamation or recycling purposes. For example, machine 100 may have features as described in U.S. patent application Ser. No. 12/551,138 with filing date Aug. 31, 2009 and entitled "Comminuting Machine Containment System" which is hereby incorporated by reference herein in its entirety. By way of further example, machine 100 may have features as provided by Harris Shredder Division of Harris Corporation, for example, Harris Model HS-80115 Shredder or otherwise. Here the comminuting machine 100 may include a frame 100F, a feed chute 110 that is fed by an infeed conveyor 1140, a feed roll 120, a shredder 130, an outfeed conveyor 1130, a containment system 140C and one or more drive units (referred to generally as "components" of the comminuting machine). It is noted that in alternate aspects of the disclosed embodiment, the comminuting machine 100 may have any suitable configuration and components. The drive units may be configured for driving one or more components of the comminuting machine 100 as will be described in greater detail below. The frame 100F is configured in any suitable manner for supporting the components of the comminuting machine 100, such as those described herein. In one example, the frame 100F may be mounted on, for example, a foundation or other suitable footing 1101 and the components may be mounted to the frame 100F in any suitable manner, such as on platforms or other suitable mounting features disposed on the frame 100F. The containment system 140C is configured to minimize a number of projectiles or particles being ejected from the comminuting machine 100 and passing outside the containment system boundary substantially without interference to feeding and discharge from the comminuting machine 100 as will be described further below.

The feed chute 110 includes a base 110B and side walls 1105 which in this example for a substantially U-shaped channel. The feed chute 110 may be mounted to the frame 100F at any suitable angle for allowing comminuting feed material to slide down the substantially U-shaped channel of the feed chute 110 by, for example, gravity so that the comminuting feed material substantially contacts the feed roller 120. In alternate aspects of the disclosed embodiment, the feed chute 110 may include a conveyor or any other suitable material transport for providing comminuting feed material to the feed roller. In still other aspects of the disclosed embodiment, the feed chute 110 may have any suitable shape for conveying comminuting feed material to the feed roller 120.

Figure 2:
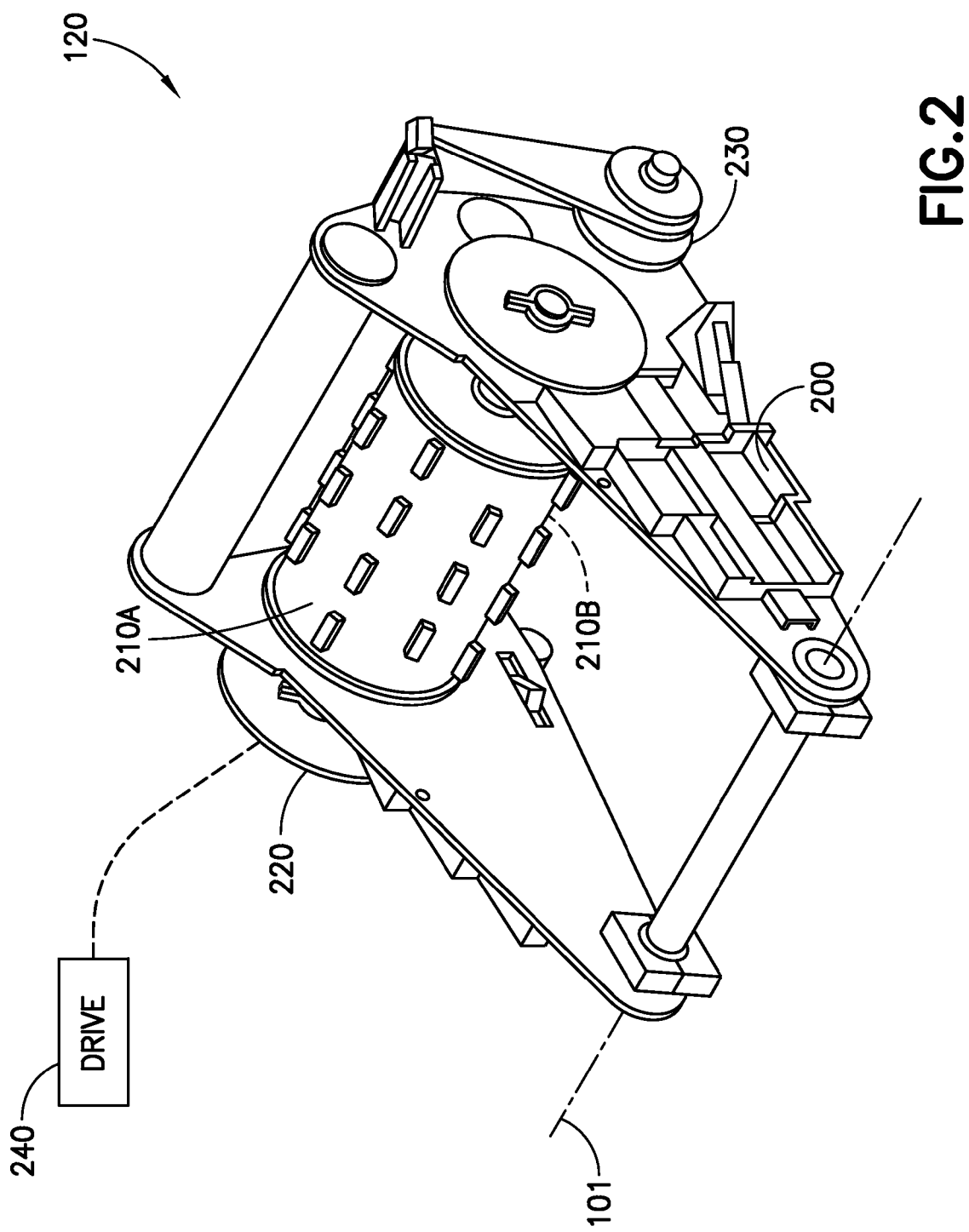
FIG. 2 is a schematic illustration of a portion of the comminuting machine of FIGS. 1A-1C in accordance with an aspect of the disclosed embodiment.

Referring also to FIG. 2, in this exemplary embodiment the feed roller 120 is configured as a double feed roller with, for example, at least one hydraulic drive 240. In alternate aspects of the disclosed embodiment, the feed roller 120 may be any suitable feed roller having any suitable drive. Here the feed roller 120 includes a frame 200 and feed rolls 210A, 210B rotatably mounted to the frame 200. The frame 200 may comprise a yoke that is pivotally mounted to, for example, the feed chute 110 (or to any suitable location of the frame 100F of the comminuting machine 100) so that the feed rolls 210A, 210B can be pivoted up and down (via for example a hydraulic cylinder or other suitable drive) about, for example, axis 101 relative to the feed chute 110 for grabbing comminuting feed material or to help crush the comminuting feed material. Each of the feed rolls 210A, 210B may include one or more drive wheels 220 connected to the drive 240 by any suitable transmission. In alternate aspects of the disclosed embodiment, each of the feed rolls 210A, 210B may have a respective drive for directly or indirectly (e.g. through a transmission) driving the feed rolls. The feed rolls 210A, 210B may be configured with protrusions or teeth that grab the comminuting feed material located on the feed chute 110 so that the comminuting feed material is fed into the shredder 130 as the feed rolls 210A, 210B are rotated.

Referring to FIGS. 1A-1C, 3, 4A and 4B the shredder includes housing 130H, internal castings 400 and rotor 300. The housing 130H may include an upper housing portion 131 and a lower housing portion 132 configured to at least partially house internal castings 400 and rotor 300. In one example, the upper housing portion 131 may be movable (e.g. pivotally mounted) relative to the lower housing portion 132. Suitable drives may be connected to the housing 130H for effecting movement of the upper housing portion 131 relative to the lower housing portion 132 for allowing access to, for example the internal casting 400 and 300. In one example the housing portions 131, 132 may be constructed of welded steel but in alternate embodiments the housing may be constructed of any suitable material(s) and in any suitable manner, such as with fasteners or with a unitary one-piece construction. The housing 130H includes an inlet 130A configured to receive comminuting feed material from the feed roller 120 and an outlet 130B configured to provide comminuted or shredded material (e.g. comminuting discharge material) to, for example, the outfeed conveyor 1130.

The internal castings 400 may be constructed of, for example, any suitable material such as a work hardening material. The internal castings 400 may include circumferential grates 420, side walls 421 and an anvil 350 that substantially form a drum in which the rotor 300 rotates. The drum includes an inlet 410 and an outlet 435. The inlet is configured for accepting the comminuting feed material provided by the feed roller 120. The outlet may include an outlet chute 430C and a grate 430. The circumferential grates 420 and outlet grate 430 include apertures of a predetermined size such that as the comminuting feed material is shredded, pieces of material that are smaller than the apertures fall through the circumferential grates 420 (e.g. bottom material discharge) or are discharged out of the grate 430 (e.g. top material discharge) for passage through the housing outlet 130B. In one example, the internal castings 400 may also include a reject door configured to discharge unshreddable material from the shredder 130 before contacting the rotor 300. The anvil 450 is configured to provide a cutting edge for the rotor 300 as the comminuting feed material enters the shredder 130. It is noted that the configuration of the internal castings 400 and the drum formed thereby is exemplary only and in alternate embodiments the internal castings may have any suitable shape and configuration for allowing rotation of the rotor and the shredding of comminuting feed material as described herein.

The rotor 300 includes a shaft 340, rotor discs 330 and hammers 320. The rotor shaft 340 may be constructed of any suitable material and is suitably mounted to, for example, the shredder housing 130H in any suitable manner. In one example, the rotor shaft 340 may be supported within the shredder 130 by self-aligning spherical roller bearings. The rotor discs 330 may be keyed to the shaft 340 so that the shaft and the discs 330 substantially rotate as a unit. The rotor discs 330 may be constructed of any suitable material such as, for example, a wear resistant material. Spacers (not shown) separate the rotor discs 330 from each other on the shaft. The rotor discs 330 on the end of the shaft 340 (e.g. the "end discs") may include suitable wipers 350 for substantially preventing material accumulation between an internal wall of the shredder housing 130H and the end discs. The hammers 320 may have any suitable shape and size and be constructed of any suitable material. The hammers 320 may be pivotally mounted to the rotor discs 330 such that the hammers 320 are allowed to swing independent of each other and relative to the rotor discs 330. The rotor 300 may be rotated within the shredder by any suitable drive 360 at any suitable speed. As the rotor 300 is rotated the hammers 320 interact with the anvil 450 for shredding the comminuting feed material fed into the shredder 130. It is noted that the hammers 320 may also interact with the one or more of the grates 420, 430 for shredding the material. As described above, as the comminuting feed material is shredded and reduced in size the grates 420, 430 allow the shredded material to pass into and through the outlet 130B of the shredder 130.

Figure 1C:
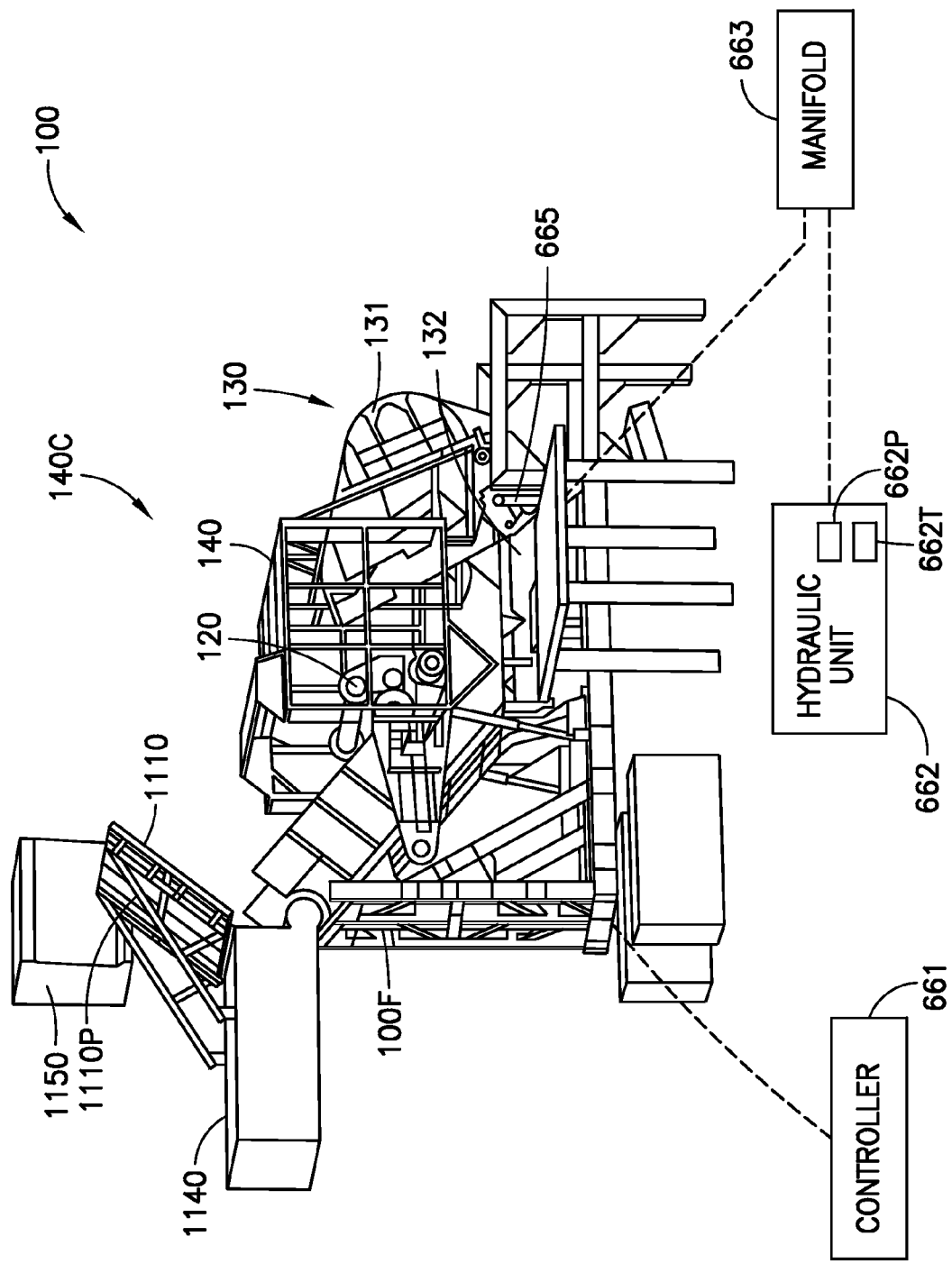

In one aspect of the exemplary embodiment, the containment system may also include a controller 661 which may be common with the controller operating the comminuting machine, or may be a separate controller that may be communicably linked to the machine controller (see for example FIG. 1C). The controller may be disposed at any suitable location(s) relative to the comminuting machine. In one example, the controller may be disposed at least partly within the operator station 1150. In another example, the comminuting machine 1100 may include a remote controller or control stations disposed at other locations on the comminuting machine that work in conjunction with the controller 661 so that the comminuting machine and its components can be operation from any suitable operating position. In one example, the controller 661 may include any suitable programmable logic controller configured to operate the various components of the comminuting machine including but not limited to solenoid valves, proximity sensors and proximity switches.

Figure 3:
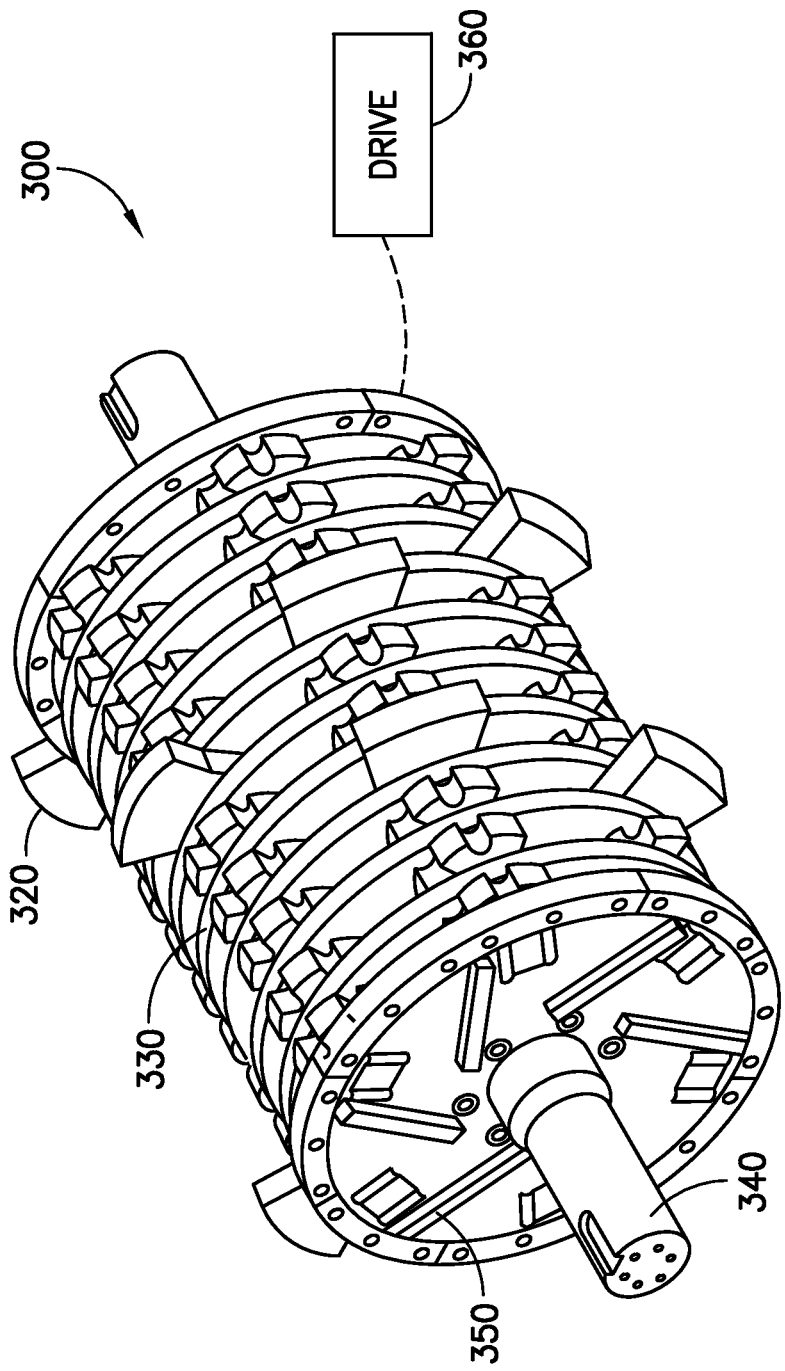
FIG. 3 is a schematic illustration of a portion of the comminuting machine of FIGS. 1A-1C in accordance with an aspect of the disclosed embodiment.
Figure 4B:
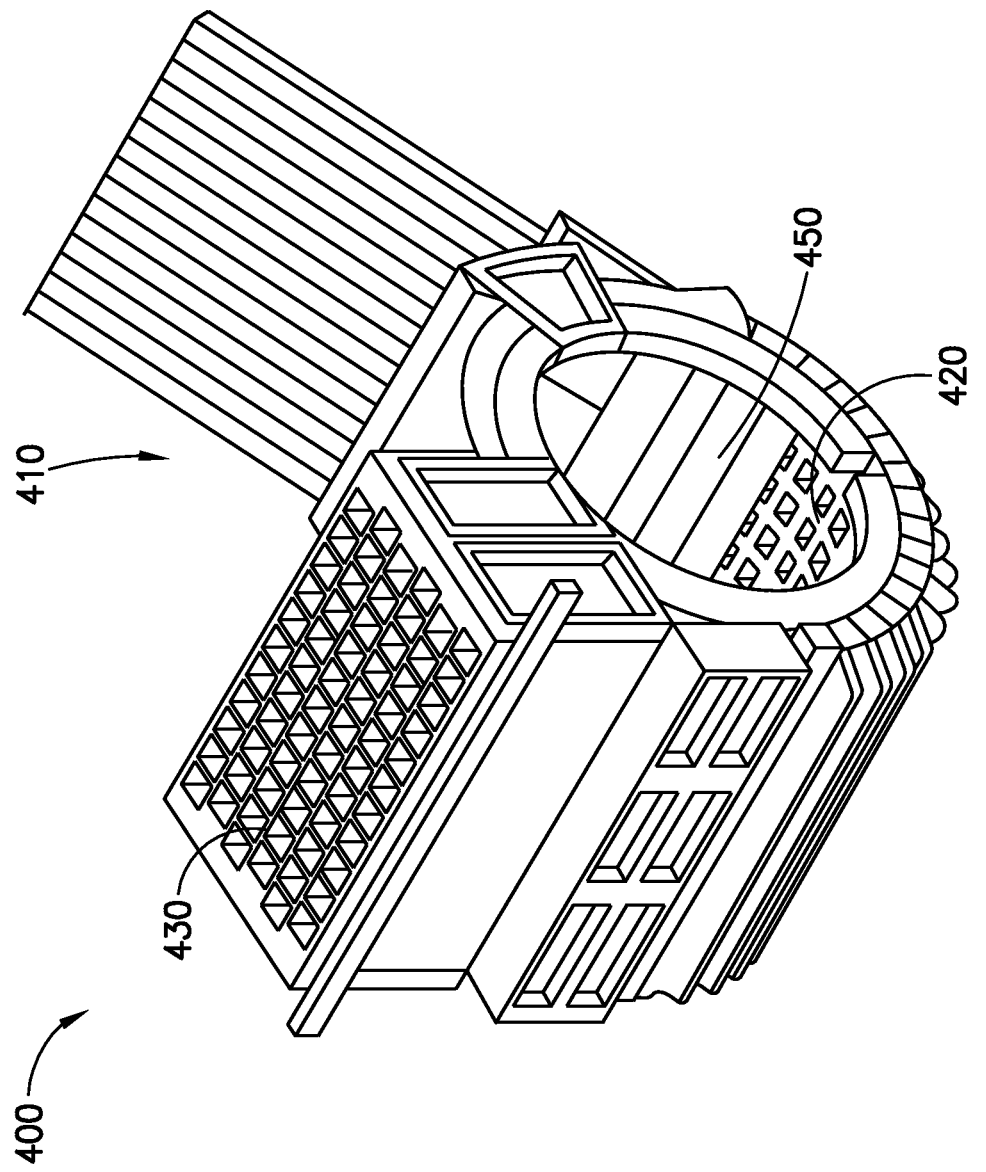
Figure 5:
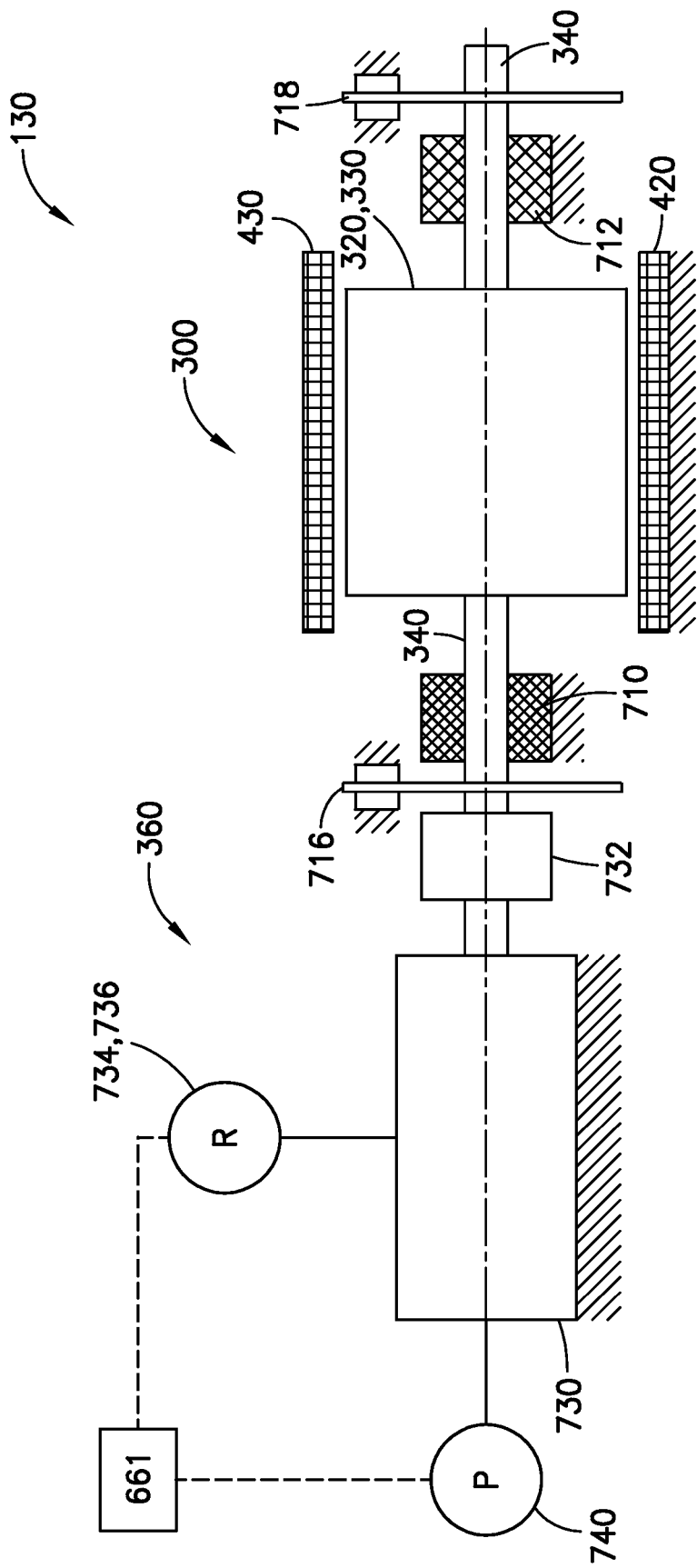
FIG. 5 is a schematic illustration of a disc rotor drive system in accordance with an aspect of the disclosed embodiment.
Figure 6:
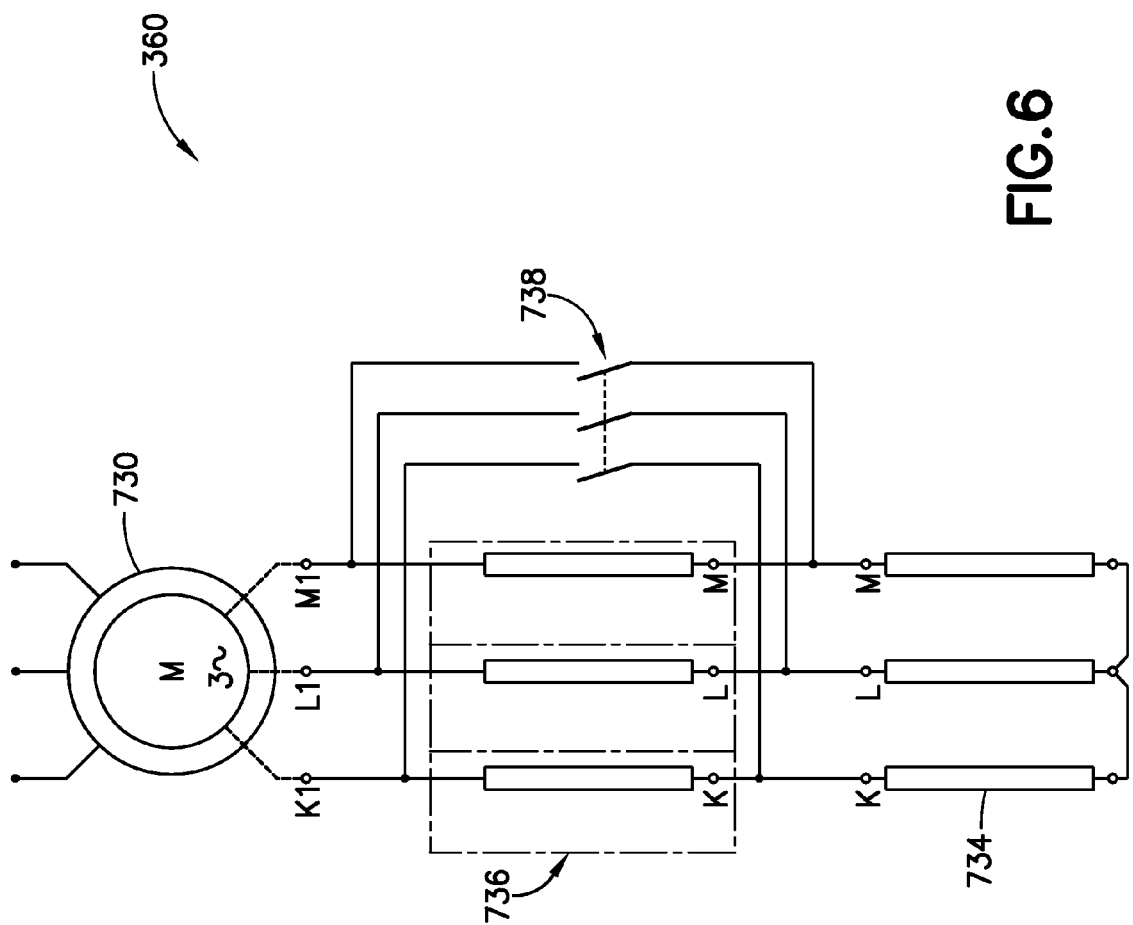
FIG. 6 is a schematic illustration of a disc rotor drive system in accordance with an aspect of the disclosed embodiment.

Referring now to FIG. 5, there is shown a schematic illustration of a disc rotor drive system. Referring also to FIG. 6, there is shown a schematic illustration of a disc rotor drive system. Shredder system 130 has rotor 300 and rotor drive 360 (FIG. 3). Rotor 300 has hammers 320 and discs 330 on shaft 340 and is shown surrounded, for example, by upper and lower grates 420, 430 (FIGS. 4A, 4B, 5). Support bearings 710, 712 may have bearings within pillow blocks or other suitable bearing support for shaft 340. One or more brakes 716, 718 may be provided where brakes 716, 718 may be electrically or hydraulically operated disc brakes or any other suitable friction brake configured to slow, stop or otherwise interrupt rotation of the shaft and rotor 300. A drive motor 730 is shown coupled to rotor shaft 340 in any suitable manner such as by power transmission 732. Here power transmission 732 may be any suitable transmission for transferring rotational power from the drive motor 730 to the rotor shaft 340. In one aspect the power transmission 732 may be a coupling, for example, allowing for misalignment or as a universal drive shaft between the drive 360 and rotor 300. Alternately, motor 730 may be coupled directly to shaft 340. Power transmission 732 may further have a multi pinion gear drive or other suitable speed reduction or power transmission. Alternately, power transfer 732 may be an air clutch and gear box to a center drive, a dual pinion gear driven drive, variable speed drive or otherwise. Power transmission 732 may further have an automatic or user operable clutch, torque limiter or fluid or other suitable coupling. Power provided by motor 730 may, by way of example, be from approximately 750 HP to approximately 10,000 HP or otherwise where, for example, a slip-ring/wound rotor type motor or other suitable motor may be utilized. In the disclosed embodiment, a friction-less brake utilizing any suitable fixed or variable loads such as, for example, rheostats may be utilized as described with respect to shredder wound rotor motor drive 360. Here primary load or rheostat 734 and secondary load or rheostat 736 are shown coupled to motor 730, such as to a winding of the motor, where motor 730 is driven by power source 740. The primary and secondary rheostats 734, 736 may be any suitable rheostats such as, for example, liquid or braking resistor rheostats. Here, power source 740, primary 734 and secondary 736 rheostats may be controlled by controller 661, manually by an operator or otherwise. The secondary rheostat 736 may be an external rheostat in that the secondary rheostat 736 may selectively be connected to motor drive 730, for example, to be engaged only for braking and bringing the speed of the rotor to 40-50% of the operating speed prior to shut down or otherwise. The secondary rheostat 736 (and/or controls therefor) may be located on a common control panel with the primary rheostat 734 (and/or controls therefor), e.g., within the operator station 1150 (FIG. 1C). In other aspects the secondary rheostat 736 (and/or controls therefor) may be located remotely from the primary rheostat 734 such as outside the operator station 1150 at any suitable location of the comminuting machine 100. The primary and secondary rheostats 734, 736 may be used in combination with each other and/or individually (e.g. selectively engaged/activated and/or where an engaged one of the rheostats bypasses a non-engaged/inactive one of the rheostats). Here, by way of example, at any suitable motor operating speed the motor 730 may be turned off and the standard disc brake 716, 718 may be engaged for final stop. Here, prior to engaging brakes 716, 718, the combined load of primary rheostat 734 and secondary rheostat 736 may be used to decelerate rotor 300. In the disclosed embodiment, the primary rheostat may be a liquid rheostat and the secondary rheostat 736 may be a braking resistor rheostat 736. In one aspect, one or more of the primary and secondary rheostats 734, 736 may be a combination of fixed or variable resistors.

As can be seen in FIG. 6, the secondary rheostat 736 may be placed in line with the primary rheostat 734 such that a bypass contactor 738 allows the secondary rheostat to be bypassed. For example, secondary rheostat 736 may be a bank of three fixed or variable resistors having parallel contactors 738. The contactors 738 may be closed, for example, during startup when the primary rheostat 734 is being utilized or during normal operation so that the additional resistance provided by the secondary rheostat is not used. During, for example, shutdown (e.g. braking of the motor 730) the primary rheostat 734 may be placed in a maximum resistance position and the bypass contactors 738 may be opened allowing the secondary resistance provided by the secondary rheostat 736 to be in line with the resistance provided by the primary rheostat 734. Alternately, contactors 738 may not be provided, for example, where the secondary rheostat 736 may be a variable resistor that may be decreased to a short.

Although drive 360 has been described with respect to slip-ring/wound rotor type motor 730 and primary and secondary rheostats 734, 736, in alternate aspects of the disclosed embodiments, any suitable motor 730 with corresponding primary and secondary loads may be provided where the primary and secondary loads may be electrical, mechanical or otherwise. For example, drive 360 may have a wound rotor motor with liquid rheostat and power factor correction capacitors. By way of further example, drive 360 may have a synchronous motor, for example, with a soft start. By way of further example, drive 360 may have an induction motor with any suitable controller as a soft-start. By way of further example, drive 360 may have a synchronous—induction motor with liquid rheostat and dc field excitation. Alternately, any suitable motor, primary and secondary load may be utilized. Here, drive 360 may utilize a slip ring wound rotor three phase motor 730 and appropriate rheostat 734, 736. Here rheostat 734 may be provided to allow motor 730 to be tolerant of long starts by limiting the starting current and the combination of rheostats 734, 736 may be utilized for braking as described where rheostats 734, 736 may be liquid resistance rheostats that insert a resistance into the rotor circuit which may be gradually reduced to a short circuit at the end of the starting cycle. Motor 730 and rheostats 734, 736 may be as commercially available, for example, from General Electric, MKS, Teco-Westinghouse or otherwise. In alternate embodiments any suitable motor 730, primary 734 and secondary 736 loads may be provided.

Figure 7:
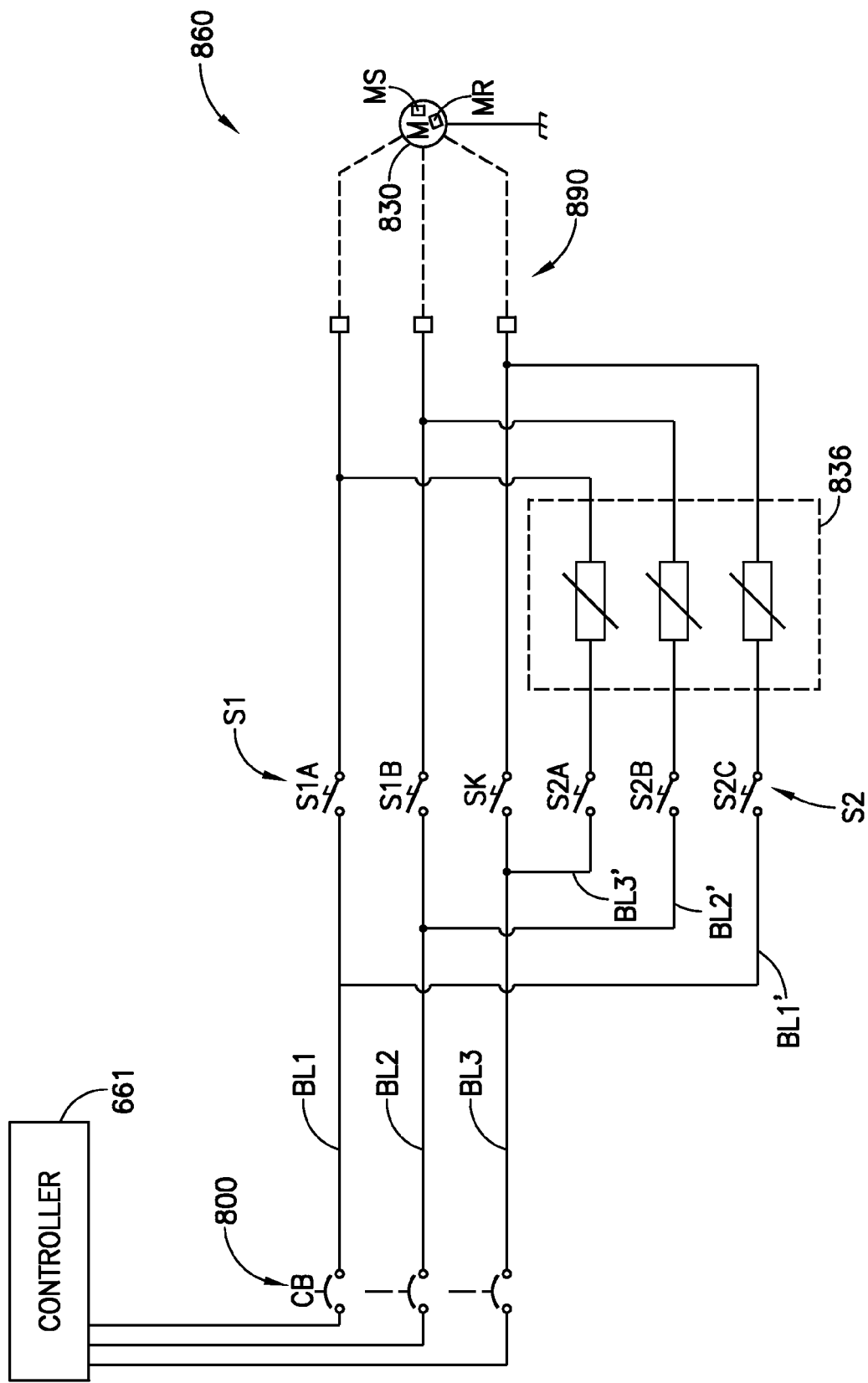
FIG. 7 is a schematic illustration of a drive system in accordance with an aspect of the disclosed embodiment.

Referring now to FIG. 7, a portion of a drive system 860 is shown for driving the rotor 300 (FIGS. 3 and 5). The drive system 860 may be substantially similar to that described above with respect to, e.g., FIG. 5 however, in this aspect the motor 830 may be controlled in any suitable manner by any suitable controller, such as controller 661. In this aspect the controller 661 may be connected to the motor through a main circuit breaker 800 and contactor S1 for selectively providing driving motive force to the motor. Here at least one selectably engageable load, such as rheostat 836, is placed on the stator circuit 890 rather than providing an additional rheostat to the secondary circuit on the wound motors as described above. The Rheostat 836 may be substantially similar to one or more of rheostats 736, 736 described above. It is noted that while only one rheostat 836 is shown any suitable number of rheostats may be provided. Also, in this aspect the motor 830 may be any suitable multi-phase motor such as those described above while in other aspects the motor 830 may be a squirrel cage motor having a high starting torque.

Here the motor 830 may be, for example, a three phase motor but in other aspects the motor 830 may have any suitable number of phases. A reverse magnetic field may be created in the motor 830 stator MS and the lines of the three phase motor may be single phased to reduce the current peaks during the transition between phases. In one aspect the reverse field is connected through the rheostat 836 so that the voltage on the motor 830 stator MS circuit is reduced. In other aspects the reverse field may be connected to the motor 830 stator MS circuit in any suitable manner. In one aspect the actual voltage of the motor 830 stator MS may be adjusted by a saline concentration of the rheostat 836, e.g., where the rheostat is a liquid resistance rheostat. In another aspect the actual voltage of the motor 830 stator MS may be adjusted manually by, for example, adjustment of rheostat electrodes or in any other suitable manner. As may be realized, the voltage on the motor 830 rotor MR may also be reduced.

As can be seen in FIG. 7, the rheostat 836 may be connected in parallel with the contactor S1 for selectively providing a stopping resistance to the motor to effect frictionless braking of the comminuting rotor. The branch or phase lines on which the rheostat 836 is located may also include contactor S2 (or the contactor S2 may be part of the rheostat 836). The contactors S1, S2 are controlled in any suitable manner such as by controller 661, relays or any other suitable control for sequencing the contactors as will be described below to allow for the selectable engagement of the rheostat 836.

As an example, during normal operation a main breaker 800 of the motor 830 is closed, the contactor S1 is closed and the contactor S2 (which is in line with rheostat 836) is open so that the rheostat 836 does not affect the motor 830 during normal operation. During braking of the motor 830 one or more phases of the motor 830 may be opened and closed in a predetermined sequence so that the branch lines BL1, BL2, BL3 and BL1', BL2', BL3' are single phased as will be described below. In one aspect, contact S1A (of the contactor S1) which is located on branch line BL1 may be opened to single phase the branch lines (FIG. 8, Block 900) then the other two contacts S1B, S1C (of the contactor S1) which are disposed respectively on branch lines BL2, BL3 may be opened (FIG. 8, Block 910).

Figure 8:
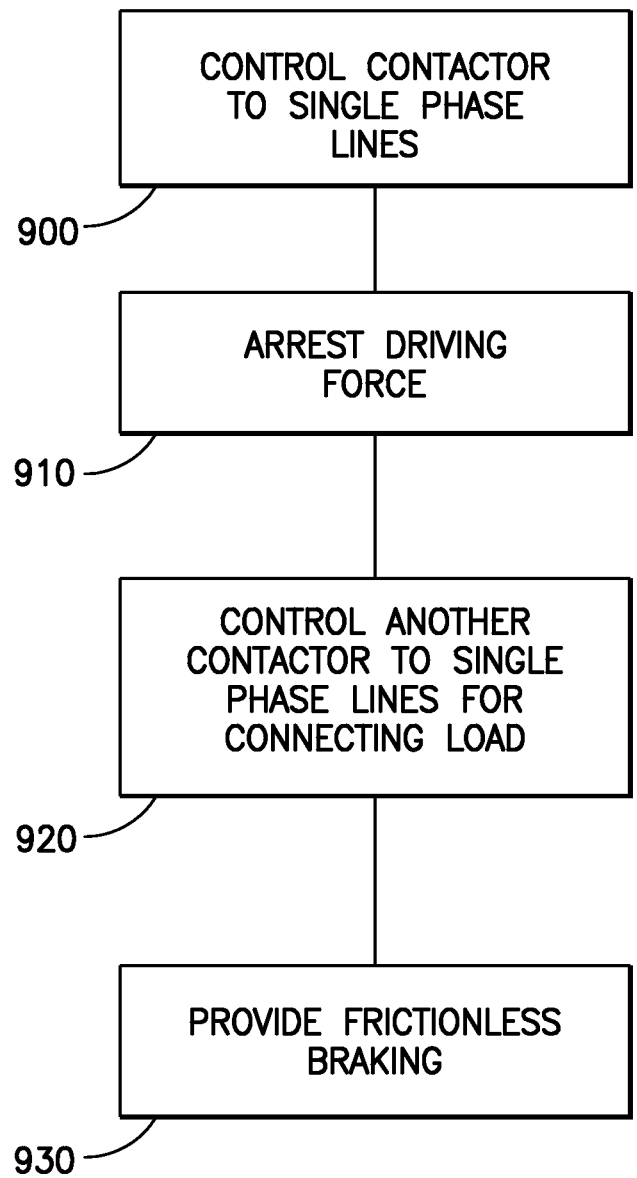
FIG. 8 illustrates a flow diagram in accordance with an aspect of the disclosed embodiment.

The controller 661 may control the contactor S2 so that the rheostat 836 is connected between the controller 661 and the motor 830 (FIG. 8, Block 920). For example, the controller 661 may close contacts S2A, S2B (of the contactor S2) to single phase the lines BL3', BL2', BL1' to/from the motor 830 so that two phases BL3', BL2' of the rheostat 836 at least in part introduce resistance to the motor 830 to provide frictionless braking. The remaining contactor S2C (of the contactor S2) which is disposed on branch line BL1' may be closed so that the rheostat 836 provides frictionless braking forces in the motor 830 (FIG. 8, Block 930). As may be realized, the sequence of opening and closing the phases of the contactors S1, S2 is exemplary and in other aspects the phases of the contactors S1, S2 may be opened and closed in any suitable sequence. In other aspects the phases S1A, S1B, S1C of contactor S1 may be opened substantially simultaneously while phases S2A, S2B, S2C of contactor S2 may be closed substantially simultaneously. At any suitable RPM of the rotor 300 the main circuit breaker 800 may be opened so that the motor 830 and/or rotor 300 are allowed to coast to a stop and/or a friction brake 716, 718 (FIG. 5) can be engaged to stop the motor 830 and/or rotor 300.

In accordance with one or more aspects of the disclosed embodiment, a comminuting machine is provided having a frame having a comminuting rotor coupled to the frame. A rotary drive is coupled to the rotor, the rotary drive having a slip-ring motor having a winding. A primary rheostat and a secondary rheostat are coupled to the winding, the primary and secondary rheostat being selectively engaged together providing braking of the slip-ring motor.

In accordance with one or more aspects of the disclosed embodiment, the primary rheostat and secondary rheostat are coupled to the winding such that the secondary rheostat is in line with the primary rheostat to provide a compounded resistance to the slip-ring motor.

In accordance with one or more aspects of the disclosed embodiment, a bypass contactor couples the primary rheostat to the winding such that the secondary rheostat can be selectively engaged.

In accordance with one or more aspects of the disclosed embodiment, the bypass contactor includes one or more contacts that are opened to selectively engage the secondary rheostat for braking of the slip-ring motor.

In accordance with one or more aspects of the disclosed embodiment, the bypass contactor includes one or more contacts that are closed to selectively disengage the secondary rheostat during slip-ring motor startup and operation.

In accordance with one or more aspects of the disclosed embodiment, one or more of the primary and secondary rheostat comprises a liquid rheostat.

In accordance with one or more aspects of the disclosed embodiment, one or more of the primary and secondary rheostat comprises a resistor bank.

In accordance with one or more aspects of the disclosed embodiment, a comminuting machine includes a frame, a comminuting rotor coupled to the frame, a rotary drive coupled to the comminuting rotor, the rotary drive having motor, and a rheostat brake connected to the motor, the rheostat brake including a primary rheostat and a secondary rheostat disposed in line with the primary rheostat to provide a compounded resistance to the motor.

In accordance with one or more aspects of the disclosed embodiment, the secondary rheostat is selectively engaged to provide the compounded resistance.

In accordance with one or more aspects of the disclosed embodiment, a bypass contactor connects the primary rheostat to the motor such that the secondary rheostat can be selectively engaged.

In accordance with one or more aspects of the disclosed embodiment, the bypass contactor includes one or more contacts that are opened to selectively engage the secondary rheostat to provide the compounded resistance.

In accordance with one or more aspects of the disclosed embodiment, the bypass contactor includes one or more contacts that are closed to selectively disengage the secondary rheostat during motor startup and operation.

In accordance with one or more aspects of the disclosed embodiment, one or more of the primary and secondary rheostat comprises a liquid rheostat.

In accordance with one or more aspects of the disclosed embodiment, one or more of the primary and secondary rheostat comprises a resistor bank.

In accordance with one or more aspects of the disclosed embodiment, a comminuting machine includes a frame, a comminuting rotor coupled to the frame, and a rotary drive coupled to the rotor, the rotary drive including a controller, a multi-phase motor connected to the controller, a set of contactors disposed between the controller and the multi-phase motor for selectively providing driving motive force to the multi-phase motor, and at least one rheostat disposed between the controller and the multi-phase motor, in parallel with the first set of contactors, for selectively providing a stopping resistance to the multi-phase motor to effect frictionless braking of the comminuting rotor, wherein the controller is configured to operate the set of contactors and the at least one rheostat to single phase lines of the multi-phase motor for providing the stopping resistance.

In accordance with one or more aspects of the disclosed embodiment, the controller is configured to operate the set of contactors to single phase lines of the multi-phase motor to disengage the driving motive force to the multi-phase motor.

In accordance with one or more aspects of the disclosed embodiment, the controller is configured to operate the at least one rheostat to single phase lines of the multi-phase motor to provide the stopping resistance to the multi-phase motor.

In accordance with one or more aspects of the disclosed embodiment, the controller is configured such that the set of contactors is closed and contactors of the rheostat are open during operation of the comminuting rotor.

In accordance with one or more aspects of the disclosed embodiment, the set of contactors includes a contactor for each phase of the multi-phase motor and the controller is configured to control each contactor to open one phase of the multi-phase motor and then open the remaining phases of the multi-phase motor.

In accordance with one or more aspects of the disclosed embodiment, the at least one rheostat includes a contactor for each phase of the multi-phase motor and the controller is configured to control each contactor to close two phases of the multi-phase motor and then close a remaining phase of the multi-phase motor.

In accordance with one or more aspects of the disclosed embodiment, the at least one rheostat is disposed on a stator circuit of the multi-phase motor.

In accordance with one or more aspects of the disclosed embodiment, a comminuting machine includes a frame, a comminuting rotor coupled to the frame, and a rotary drive coupled to the rotor, the rotary drive including a multi-phase motor, a controller connected to the multi-phase motor, a first set of contactors disposed in the connection between the multi-phase motor and the controller such that each phase of the multi-phase motor includes a respective contactor, a second set of contactors disposed in the connection between the multi-phase motor and the controller in parallel with the first set of contactors such that each phase of the multi-phase motor includes a respective contactor, where the first set of contactors and the second set of contactors are selectably engageable, and a load disposed on each phase of the multi-phase motor in-line with a respective one of the second set of contactors, wherein the controller is configured to open each contactor in the first set of contactors in a first predetermined sequence and close each contactor in the second set of contactors in second predetermined sequence to provide frictionless braking of the multi-phase motor.

In accordance with one or more aspects of the disclosed embodiment, the multi-phase motor is a three phase motor, the first predetermined sequence is open a contactor on one phase and then substantially simultaneously open contactors on remaining phases, and the second predetermined sequence is substantially simultaneously close contactors on two phases and then close a contactor on a remaining phase.

In accordance with one or more aspects of the disclosed embodiment, the controller is configured to open the first set of contactors prior to closing the second set of contactors to provide the frictionless braking of the multi-phase motor.

In accordance with one or more aspects of the disclosed embodiment, the load is at least one rheostat.

In accordance with one or more aspects of the disclosed embodiment, the at least one rheostat is disposed on a stator circuit of the multi-phase motor.

In accordance with one or more aspects of the disclosed embodiment, a method for providing frictionless braking of a comminuting rotor of a comminuting machine where the comminuting rotor is driven by a multi-phase motor is provided. The method includes controlling, with a controller of the comminuting machine, a set of contactors disposed between the controller and the multi-phase motor where the set of contactors selectively provide driving motive force to the multi-phase motor, and controlling, with the controller, at least one rheostat disposed between the controller and the multi-phase motor, in parallel with the set of contactors, for selectively providing a stopping resistance to the multi-phase motor to effect frictionless braking of the comminuting rotor, and operating, with the controller, the first and second set of contactors to single phase lines of the multi-phase motor for providing the stopping resistance to effect the frictionless braking of the comminuting rotor.

In accordance with one or more aspects of the disclosed embodiment, the set of contactors are operated by the controller to single phase lines of the multi-phase motor to disengage the driving motive force to the multi-phase motor.

In accordance with one or more aspects of the disclosed embodiment, the at least one rheostat is operated by the controller to single phase lines of the multi-phase motor to provide the stopping resistance to the multi-phase motor.

In accordance with one or more aspects of the disclosed embodiment, the set of contactors is closed and contactors of the rheostat are open during comminuting operation of the comminuting rotor.

In accordance with one or more aspects of the disclosed embodiment, the set of contactors includes a contactor for each phase of the multi-phase motor and the method further includes controlling each contactor to open one phase of the multi-phase motor and then open the remaining phases of the multi-phase motor.

In accordance with one or more aspects of the disclosed embodiment, the at least one rheostat includes a contactor for each phase of the multi-phase motor and the method further includes controlling each contactor to close two phases of the multi-phase motor and then close a remaining phase of the multi-phase motor.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. A comminuting machine comprising:
a frame;
a comminuting rotor coupled to the frame; and
a rotary drive coupled to the rotor, the rotary drive including
 a controller,
 a multi-phase motor connected to the controller,
 a set of contactors disposed between the controller and the multi-phase motor for selectively providing driving motive force to the multi-phase motor, and
 at least one rheostat disposed between the controller and the multi-phase motor, in parallel with the set of contactors, for selectively providing a stopping resistance to the multi-phase motor to effect frictionless braking of the comminuting rotor,
wherein the controller is configured to operate the set of contactors and the at least one rheostat to single phase lines of the multi-phase motor for providing the stopping resistance.

2. The comminuting machine of claim 1, wherein the controller is configured to operate the set of contactors to single phase lines of the multi-phase motor to disengage the driving motive force to the multi-phase motor.

3. The comminuting machine of claim 1, wherein the controller is configured to operate the at least one rheostat to single phase lines of the multi-phase motor to provide the stopping resistance to the multi-phase motor.

4. The comminuting machine of claim 1, wherein the controller is configured such that the set of contactors is closed and contactors of the rheostat are open during operation of the comminuting rotor, where the controller is configured to control the contactors of the rheostat.

5. The comminuting machine of claim 4, wherein the set of contactors includes a contactor for each phase of the multi-phase motor and the controller is configured to control each contactor to open one phase of the multi-phase motor and then open the remaining phases of the multi-phase motor.

6. The comminuting machine of claim 4, wherein the at least one rheostat includes a contactor for each phase of the multi-phase motor and the controller is configured to control each contactor to close two phases of the multi-phase motor and then close a remaining phase of the multi-phase motor.

7. The comminuting machine of claim 1, wherein the at least one rheostat is disposed on a stator circuit of the multi-phase motor.

8. A comminuting machine comprising:
a frame;
a comminuting rotor coupled to the frame; and
a rotary drive coupled to the rotor, the rotary drive including a multi-phase motor, a controller connected to the multi-phase motor, a first set of contactors disposed in the connection between the multi-phase motor and the controller such that each phase of the multi-phase motor includes a respective contactor, a second set of contactors disposed in the connection between the multi-phase motor and the controller in parallel with the first set of contactors such that each phase of the multi-phase motor includes a respective contactor, where the first set of contactors and the second set of contactors are selectably engageable, and a load disposed on each phase of the multi-phase motor in-line with a respective one of the second set of contactors, wherein the controller is configured to open each contactor in the first set of contactors in a first predetermined sequence and close each contactor in the second set of contactors in second predetermined sequence to provide frictionless braking of the multi-phase motor.

9. The comminuting machine of claim 8, wherein the multi-phase motor is a three phase motor, the first predetermined sequence is open a contactor of the contactors on one phase and then substantially simultaneously open contactors of the first set of contactors on remaining phases, and the second predetermined sequence is substantially simultaneously close contactors of the second set of contactors on two phases and then close a contactor of the second set of contactors on a remaining phase.

10. The comminuting machine of claim 8, wherein the controller is configured to open the first set of contactors prior to closing the second set of contactors to provide the frictionless braking of the multi-phase motor.

11. The comminuting machine of claim 8, wherein the load is at least one rheostat.

12. The comminuting machine of claim 11, wherein the at least one rheostat is disposed on a stator circuit of the multi-phase motor.

13. A method for providing frictionless braking of a comminuting rotor of a comminuting machine where the comminuting rotor is driven by a multi-phase motor, the method comprising:

controlling, with a controller of the comminuting machine, a set of contactors disposed between the controller and the multi-phase motor where the set of contactors selectively provide driving motive force to the multi-phase motor, controlling, with the controller, at least one rheostat disposed between the controller and the multi-phase motor, in parallel with the set of contactors, for selectively providing a stopping resistance to the multi-phase motor to effect frictionless braking of the comminuting rotor, and operating, with the controller, the set of contactors to single phase lines of the multi-phase motor for providing the stopping resistance to effect the frictionless braking of the comminuting rotor.

14. The method of claim 13, wherein the set of contactors are operated by the controller to single phase lines of the multi-phase motor to disengage the driving motive force to the multi-phase motor.

15. The method of claim 13, wherein the at least one rheostat is operated by the controller to single phase lines of the multi-phase motor to provide the stopping resistance to the multi-phase motor.

16. The method of claim 13, wherein the set of contactors is closed and contactors of the rheostat are open during comminuting operation of the comminuting rotor.

17. The method of claim 16, wherein the set of contactors includes a contactor for each phase of the multi-phase motor and the method further includes controlling each contactor to open one phase of the multi-phase motor and then open the remaining phases of the multi-phase motor.

18. The method of claim 16, wherein the at least one rheostat includes a contactor for each phase of the multi-phase motor and the method further includes controlling each contactor of the rheostat to close two phases of the multi-phase motor and then close a remaining phase of the multi-phase motor.

* * * * *

UNITED STATES PATENT AND TRADEMARK OFFICE
CERTIFICATE OF CORRECTION

| | | |
|---|---|---|
| PATENT NO. | : 9,186,684 B2 | |
| APPLICATION NO. | : 13/863815 | |
| DATED | : November 17, 2015 | |
| INVENTOR(S) | : Javier Herrera | |

It is certified that error appears in the above-identified patent and that said Letters Patent is hereby corrected as shown below:

In The Claims

Column 11, Claim 9, line 25, after the second occurrence of "the" should be --first set of--.

Signed and Sealed this
Fifteenth Day of March, 2016

Michelle K. Lee
*Director of the United States Patent and Trademark Office*